US011556260B2

(12) United States Patent
Han et al.

(10) Patent No.: US 11,556,260 B2
(45) Date of Patent: Jan. 17, 2023

(54) PROVIDING COORDINATION BETWEEN MAPPER CIRCUITRY AND REDUNDANT ARRAY OF INDEPENDENT DISKS (RAID) CIRCUITRY TO MANAGE RAID STORAGE SPACE

(71) Applicant: EMC IP Holding Company LLC, Hopkinton, MA (US)

(72) Inventors: Geng Han, Beijing (CN); Vamsi K. Vankamamidi, Hopkinton, MA (US); Shuyu Lee, Acton, MA (US); Jian Gao, Beijing (CN); Xiaobo Zhang, Beijing (CN); Rongrong Shang, Beijing (CN); Ajay Karri, South Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 303 days.

(21) Appl. No.: 16/815,348

(22) Filed: Mar. 11, 2020

(65) Prior Publication Data

US 2021/0286536 A1 Sep. 16, 2021

(51) Int. Cl.
*G06F 11/00* (2006.01)
*G06F 3/06* (2006.01)
*G06F 11/20* (2006.01)

(52) U.S. Cl.
CPC .......... *G06F 3/0644* (2013.01); *G06F 3/0604* (2013.01); *G06F 3/0659* (2013.01); *G06F 3/0689* (2013.01); *G06F 11/2069* (2013.01); *G06F 2201/82* (2013.01)

(58) Field of Classification Search
CPC .... G06F 3/0644; G06F 3/0604; G06F 3/0659; G06F 3/0689; G06F 11/2069; G06F 11/1076; G06F 11/1088; G06F 11/2089
See application file for complete search history.

(56) References Cited

U.S. PATENT DOCUMENTS

| 8,370,542 | B2 | 2/2013 | Lu et al. |
| 9,792,305 | B1 | 10/2017 | Bhamidipati |
| 10,126,949 | B2 | 11/2018 | Vijayan et al. |
| 10,192,065 | B2 | 1/2019 | Iyer et al. |
| 11,238,173 | B2 | 2/2022 | Iyer et al. |
| 2013/0318316 | A1* | 11/2013 | Yamada ................. G06F 3/065 |
| | | | 711/162 |
| 2015/0324264 | A1* | 11/2015 | Chinnakkonda Vidyapoornachary ...................... |
| | | | G06F 11/2084 |
| | | | 714/6.11 |

(Continued)

*Primary Examiner* — Philip Guyton
(74) *Attorney, Agent, or Firm* — BainwoodHuang

(57) ABSTRACT

Techniques are directed to managing Redundant Array of Independent Disks (RAID) storage space. One technique involves providing, by RAID circuitry, a storage space request to mapper circuitry; receiving, by the RAID circuitry, a storage space reply from the mapper circuitry in response to the storage space request; and performing, by the RAID circuitry, a follow-up operation based on the storage space reply from the mapper circuitry. Another technique involves, receiving, by mapper circuitry, a storage space request from RAID circuitry; performing, by the mapper circuitry, a storage space management operation in response to the storage space request; and providing, by the mapper circuitry, a storage space reply to the RAID circuitry, the storage space reply identifying a result of the storage space management operation.

20 Claims, 7 Drawing Sheets

(56) References Cited

U.S. PATENT DOCUMENTS

2016/0259594 A1\* 9/2016 Takahashi .............. G06F 3/0688
2021/0286536 A1\* 9/2021 Han ...................... G06F 3/0631

\* cited by examiner

PROVIDING COORDINATION BETWEEN MAPPER CIRCUITRY AND REDUNDANT ARRAY OF INDEPENDENT DISKS (RAID) CIRCUITRY TO MANAGE RAID STORAGE SPACE

BACKGROUND

Conventional data storage systems store host data in storage drives and retrieve host data from the storage drives on behalf of hosts. Such storage may be filed-based and/or block-based.

Some data storage systems have architectures in which particular functionality is separated into different sections or modules. Along these lines, a particular data storage system may have a mapping section that manages storage capacity (e.g., consumes unused physical capacity for metadata storage and user data storage), a Redundant Array of Independent Disks (RAID) section that implements one or more RAID Levels (e.g., reserves spare space for a spare drive and performs data recovery using the spare drive in response to a drive failure), and so on.

SUMMARY

Unfortunately, there are deficiencies to the above-described conventional data storage system that has a mapping section and a Redundant Array of Independent Disks (RAID) section. For example, suppose that there is only a small amount of free storage capacity still available within the data storage system. In such a situation, the mapping section and the RAID section may compete for the remaining amount of free storage capacity leading to uncertain outcomes such as transitioning to read-only mode or perhaps even to a data unavailable (DU) state.

For example, suppose that a storage drive of the conventional data storage system fails and the RAID section rebuilds data on a spare drive leaving no reserved spare capacity. In this scenario, if another storage drive of the data storage system fails, the RAID section will attempt to consume any available space remaining in the data storage system without notifying the mapping section. During such operation, the mapping section will see the expandable capacity shrink suddenly and, if the mapping section attempts to allocate storage (e.g., an uber) for metadata storage but fails, the mapping section will immediately transition the data storage system to read-only mode.

Continuing with the example above, suppose that the mapping section is configured to monitor capacity utilization. Based on such utilization, the mapping section may make certain critical decisions especially when the capacity utilization is high. When calculating capacity utilization, the mapping section may compute the total physical capacity that the mapping section could consume. However, when the mapping section sees the consumable total capacity drop suddenly after the above-described second drive failure, the mapper section will also see capacity utilization jump sharply and this unexpected situation may cause the data storage system to enter the DU state.

As another example, suppose that mapping section has an internal mechanism that is configured to shift consumed user data capacity to metadata capacity. To this end, the internal mechanism unmaps user data storage (e.g., an uber that stores user data) to release storage space (e.g., to free drive slices) and then re-uses the released storage space for metadata (e.g., to create a new uber for storing metadata). During this operation, the RAID section may have no knowledge that the mapping section has released user data storage capacity for the purpose of re-using that capacity for storing metadata. Accordingly, the RAID section may inadvertently disrupt the operation by consuming the released user data storage capacity to create a spare drive. As a result, the shifting process performed by the mapping section may fail causing the mapping section to transition the data storage system to a DU state.

In contrast to the above-described conventional data storage system having a mapping section and a RAID section that may compete for remaining free storage capacity resulting in uncertainty, improved techniques involve mapper circuitry and RAID circuitry communicating with each other to coordinate management of RAID storage space. Such techniques may introduce the concept of ownership to physical storage capacity. Additionally, such techniques may provide a protocol for balancing capacity between the mapper circuitry and the RAID circuitry to avoid uncertainty situations (e.g., inadvertently entering a DU state). Furthermore, such techniques may provide a well-defined procedure for updating physical storage capacity ownership in response to adding and/or removing storage devices.

One embodiment is directed to a method of managing RAID storage space. The method includes providing, by RAID circuitry, a storage space request to mapper circuitry. The method further includes receiving, by the RAID circuitry, a storage space reply from the mapper circuitry in response to the storage space request. The method further includes performing, by the RAID circuitry, a follow-up operation based on the storage space reply from the mapper circuitry.

In some arrangements, providing the storage space request to the mapper circuitry includes sending, as the storage space request, an unmap call to the mapper circuitry through an application programming interface (API). The unmap call identifies a requested amount of space.

In some arrangements, receiving the storage space reply from the mapper circuitry in response to the storage space request includes obtaining, as the storage space reply, an unmap status from the mapper circuitry through the API. The unmap status identifies an answered amount of space.

In some arrangements, the RAID circuitry is constructed and arranged to persistently maintain a mapper capacity value and a spare capacity value. The mapper capacity value identifies a maximum amount of storage space that is consumable by the mapper circuitry. The spare capacity value identifies an amount of storage space that is reserved as spare space for use in response to a storage device failure.

In some arrangements, the answered amount of space identified by the unmap status equals the requested amount of space. Additionally, performing the follow-up operation based on the storage space reply from the mapper circuitry includes decreasing the mapper capacity value by the requested amount of space, and increasing the spare capacity value by the requested amount of space to support rebuilding an entire storage device in response to a storage device failure.

In some arrangements, the answered amount of space identified by the unmap status is more than zero and is less than the requested amount of space. Additionally, performing the follow-up operation based on the storage space reply from the mapper circuitry includes decreasing the mapper capacity value by the answered amount of space, increasing the spare capacity value by the answered amount of space, and sending additional unmap calls to the mapper circuitry through the API to request additional storage space to reach a level that supports rebuilding an entire storage device in response to a storage device failure.

In some arrangements, the answered amount of space identified by the unmap status is zero. Additionally, performing the follow-up operation based on the storage space reply from the mapper circuitry includes sending additional unmap calls to the mapper circuitry through the API to request storage space.

In some arrangements, the method further includes receiving, by the RAID circuitry, an unmap opcode from the mapper circuitry. The unmap opcode indicates whether the mapper circuitry has released reservable space available for use by the RAID circuitry in response to a storage device failure or whether the mapper circuitry has released unreservable space for use by the mapper circuitry.

In some arrangements, the method further includes identifying added space from a newly added storage device, apportioning a first amount of the added space to the spare capacity value to increase the spare capacity value to a level that supports rebuilding an entire storage device in response to a storage device failure, and apportioning a remaining amount of the added space to the mapper capacity value.

Another embodiment is directed to data storage equipment which includes a storage device interface, mapper circuitry, and RAID circuitry coupled to the storage device interface and the mapper circuitry. The RAID circuitry is constructed and arranged to manage RAID storage space through the storage device interface by:
(A) providing a storage space request to the mapper circuitry,
(B) receiving a storage space reply from the mapper circuitry in response to the storage space request, and
(C) performing a follow-up operation based on the storage space reply from the mapper circuitry.

Yet another embodiment is directed to a computer program product having a non-transitory computer readable medium which stores a set of instructions to manage RAID storage space. The set of instructions, when carried out by RAID circuitry, causes the RAID circuitry to perform a method of:
(A) providing a storage space request to mapper circuitry;
(B) receiving a storage space reply from the mapper circuitry in response to the storage space request; and
(C) performing a follow-up operation based on the storage space reply from the mapper circuitry.

Yet another embodiment is directed to a method of managing RAID storage space. The method includes:
(A) receiving, by mapper circuitry, a storage space request from RAID circuitry;
(B) performing, by the mapper circuitry, a storage space management operation in response to the storage space request; and
(C) providing, by the mapper circuitry, a storage space reply to the RAID circuitry.
The storage space reply identifies a result of the storage space management operation.

In some arrangements, receiving the storage space request from the RAID circuitry includes obtaining, as the storage space request, an unmap call from the RAID circuitry through an API. The unmap call identifies a requested amount of space.

In some arrangements, providing the storage space reply to the RAID circuitry includes sending, as the storage space reply, an unmap status to the RAID circuitry through the API. The unmap status identifies an answered amount of space as at least a portion of the result of the storage space management operation.

In some arrangements, the RAID circuitry is constructed and arranged to persistently maintain a mapper capacity value and a spare capacity value. The mapper capacity value identifies a maximum amount of storage space that is consumable by the mapper circuitry. The spare capacity value identifies an amount of storage space that is reserved as spare space for use in response to a storage device failure.

In some arrangements, performing the storage space management operation in response to the storage space request includes determining that enough free capacity currently exists within the mapper capacity value to grant the requested amount of space, and identifying, as the answered amount of space in the unmap status, the requested amount of space to enable the RAID circuitry to decrease the mapper capacity value by the requested amount of space and increase the spare capacity value by the requested amount of space to support rebuilding an entire storage device in response to a storage device failure.

In some arrangements, wherein performing the storage space management operation in response to the storage space request includes determining that some free capacity currently exists within the mapper capacity value but less than the requested amount of space currently exists within the mapper capacity value, initiating a background garbage collection service to reclaim storage space, and identifying, as the answered amount of space in the unmap status, more than zero and less than the requested amount of space to enable the RAID circuitry to decrease the mapper capacity value by the answered amount of space, increase the spare capacity value by the answered amount of space, and send additional unmap calls to the mapper circuitry through the API to request additional storage space to reach a level that supports rebuilding an entire storage device in response to a storage device failure.

In some arrangements, performing the storage space management operation in response to the storage space request includes determining that no space capacity is currently exists for the RAID circuitry based on the mapper capacity value, and identifying, as the answered amount of space in the unmap status, zero to cause the RAID circuitry to send additional unmap calls to the mapper circuitry through the API to request storage space.

In some arrangements, the method further includes providing, by the mapper circuitry, an unmap opcode to the RAID circuitry, the unmap opcode indicating whether the mapper circuitry has released reservable space available for use by the RAID circuitry in response to a storage device failure or whether the mapper circuitry has released unreservable space for use by the mapper circuitry.

Yet another embodiment is directed to data storage equipment which includes a storage device interface, RAID circuitry, and mapper circuitry coupled to the storage device interface and the RAID circuitry. The mapper circuitry is constructed and arranged to manage RAID storage space through the storage device interface by:
(A) receiving a storage space request from the RAID circuitry;
(B) performing a storage space management operation in response to the storage space request; and
(C) providing a storage space reply to the RAID circuitry, the storage space reply identifying a result of the storage space management operation.

Yet another embodiment is directed to a computer program product having a non-transitory computer readable medium which stores a set of instructions to manage RAID storage space. The set of instructions, when carried out by mapper circuitry, causes the mapper circuitry to perform a method of:

(A) receiving a storage space request from RAID circuitry;
(B) performing a storage space management operation in response to the storage space request; and
(C) providing a storage space reply to the RAID circuitry, the storage space reply identifying a result of the storage space management operation.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in providing coordination between mapper circuitry and RAID circuitry to manage RAID storage space.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

An improved technique involves mapper circuitry and Redundant Array of Independent Disks (RAID) circuitry communicating with each other to manage RAID storage space. Such a technique may introduce the concept of ownership to physical storage capacity. Additionally, such a technique may provide a protocol for balancing capacity between the mapper circuitry and the RAID circuitry to avoid uncertainty situations (e.g., inadvertently entering a data unavailable or DU state). Furthermore, such a technique may provide a well-defined procedure for updating physical storage capacity ownership in response to adding and/or removing storage devices.

Figure 1:
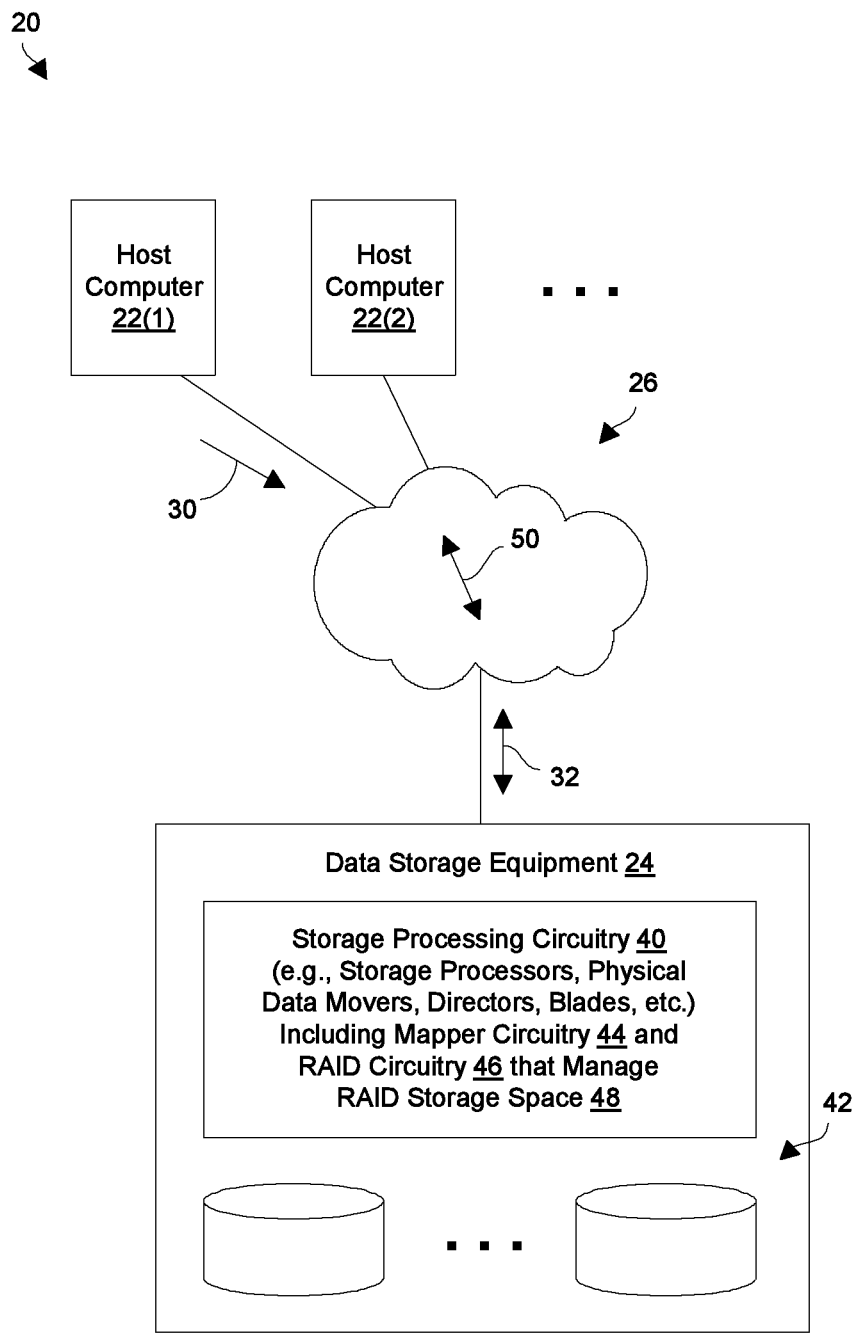
FIG. 1 is a block diagram of a data storage environment in which mapper circuitry and Redundant Array of Independent Disks (RAID) circuitry communicate with each other to manage RAID storage space in accordance with certain embodiments.

FIG. 1 shows a data storage environment 20 which involves mapper circuitry and RAID circuitry communicating with each other to coordinate management of RAID storage space. The data storage environment 20 includes host computers 22(1), 22(2), . . . (collectively, host computers 22), data storage equipment 24, and a communications medium 26.

Each host computer 22 is constructed and arranged to perform useful work. For example, one or more of the host computers 22 may operate as a file server, a web server, an email server, an enterprise server, a database server, a transaction server, combinations thereof, etc. which provides host I/O requests 30 to the data storage equipment 24. In this context, the host computers 22 may provide a variety of different I/O requests 30 (e.g., write commands, read commands, combinations thereof, etc.) that direct the data storage equipment 24 to store host data 32 within and retrieve host data 32 from storage (e.g., primary storage or main memory, secondary storage or non-volatile memory, tiered storage, combinations thereof, etc.).

The data storage equipment 24 includes storage processing circuitry 40 and storage devices 42. The storage processing circuitry 40 is constructed and arranged to respond to the host I/O requests 30 from the host computers 22 by writing host data 32 into the storage devices 42 and reading host data 32 from the storage devices 42 (e.g., solid state drives, magnetic disk drives, combinations thereof, etc.). The storage processing circuitry 40 may include one or more physical storage processors or engines, data movers, director boards, blades, I/O modules, storage device controllers, switches, other hardware, combinations thereof, and so on. While processing the host I/O requests 30, the storage processing circuitry 40 is constructed and arranged to provide a variety of specialized data storage services and features such as caching, storage tiering, deduplication, compression, encryption, mirroring and/or other RAID protection, snapshotting, backup/archival services, replication to other data storage equipment, and so on.

As will be explained in further detail shortly, the storage processing circuitry 40 includes mapper circuitry 44 and RAID circuitry 46 that manage RAID storage space 48 (e.g., one or more tiers formed by ubers) provided by the storage devices 42. During such activity, the mapper circuitry 44 and RAID circuitry 46 communicate with each other to coordinate such storage space management. To support such coordination, the mapper circuitry 44 and RAID circuitry 46 utilize the concept of physical storage capacity ownership (i.e., how much capacity the mapper circuitry 44 and the RAID circuitry 46 are allowed to control). Additionally, the mapper circuitry 44 and RAID circuitry 46 utilize a protocol (i.e., a predetermined set of messages exchanged via an application programming interface or API) for balancing capacity between the mapper circuitry 44 and the RAID circuitry 46. Furthermore, the mapper circuitry 44 and RAID circuitry 46 perform well-defined procedures when updating storage capacity ownership in response to adding and/or removing storage devices. Accordingly, the data storage equipment 24 avoids uncertainty situations (e.g., inadvertently entering a read-only mode or a DU state). Further details will now be provided with reference to FIG. 2.

Figure 2:
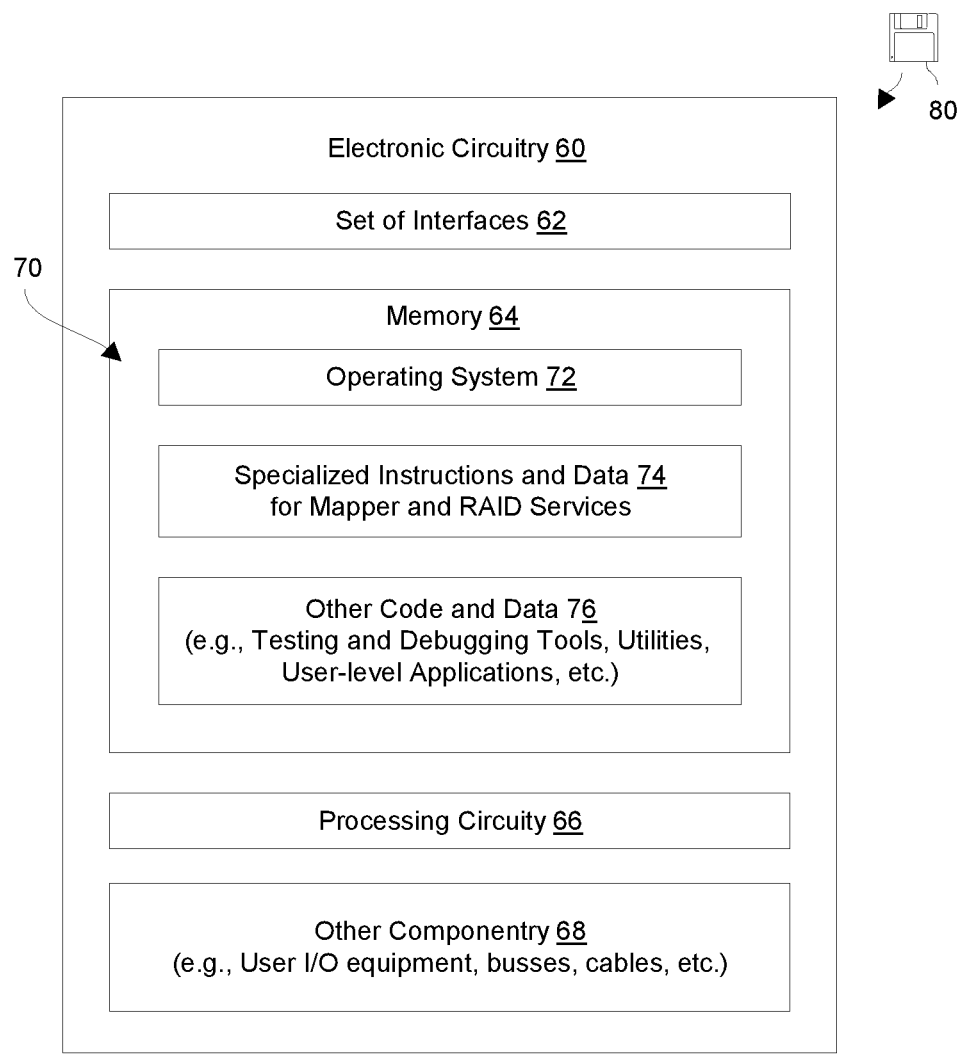
FIG. 2 is a block diagram of data storage equipment of the data storage environment of FIG. 1 in accordance with certain embodiments.

FIG. 2 shows electronic circuitry 60 which is suitable for the storage processing circuitry 40 of the data storage equipment 24 (also see FIG. 1). The electronic circuitry 60 includes a set of interfaces 62, memory 64, and processing circuitry 66, and other circuitry 68.

The set of interfaces 62 is constructed and arranged to connect the electronic circuitry 60 to the communications medium 26 (also see FIG. 1) to enable communications with other devices of the data storage environment 20 (e.g., the host computers 22). Such communications may be IP-based, SAN-based, cellular-based, cable-based, fiber-optic based, wireless, cloud-based, combinations thereof, and so on. Accordingly, the set of interfaces 62 may include one or more host interfaces (e.g., a computer network interface, a fibre-channel interface, etc.), one or more storage device interfaces (e.g., a host adapter or HBA, etc.), and other interfaces. As a result, the set of interfaces 62 enables the electronic circuitry 60 to robustly and reliably communicate with other external apparatus.

The memory 64 is intended to represent both volatile storage (e.g., DRAM, SRAM, etc.) and non-volatile storage (e.g., flash memory, magnetic memory, etc.). The memory 64 stores a variety of software constructs 70 including an operating system 72, specialized instructions and data 74, and other code and data 76. The operating system 72 refers to particular control code such as a kernel to manage computerized resources (e.g., processor cycles, memory space, etc.), drivers (e.g., an I/O stack), and so on. The specialized instructions and data 74 refers to particular control code for mapper and RAID services. In some arrangements, the specialized instructions and data 74 is tightly integrated with or part of the operating system 72 itself. The other code and data 76 refers to applications and routines to provide additional operations and services (e.g., performance measurement tools, etc.), user-level applications, administrative tools, utilities, and so on.

The processing circuitry 66 is constructed and arranged to operate in accordance with the various software constructs 70 stored in the memory 64. As will be explained in further detail shortly, the processing circuitry 66 executes the operating system 72 and the specialized code 74 to form specialized circuitry that responds to I/O requests 30 (e.g., read and write commands). Such processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the storage processing circuitry 60. In particular, the computer program product 80 has a non-transitory (or non-volatile) computer readable medium which stores a set of instructions that controls one or more operations of the electronic circuitry 60. Examples of suitable computer readable storage media include tangible articles of manufacture and apparatus which store instructions in a non-volatile manner such as DVD, CD-ROM, flash memory, disk memory, tape memory, and the like.

The other componentry 68 refers to other hardware of the electronic circuitry 60. Along these lines, the electronic circuitry 60 may include special user I/O equipment (e.g., a service processor), busses, cabling, adaptors, transducers, auxiliary apparatuses, other specialized data storage componentry, etc.

It should be understood that the processing circuitry 66 operating in accordance with the software constructs 70 enables formation of certain specialized circuits such as the mapper circuitry 44 and the RAID circuitry 46. Alternatively, all or part of such circuitry may be formed by separate and distinct hardware. Further details will now be provided with reference to FIG. 3.

Figure 3:
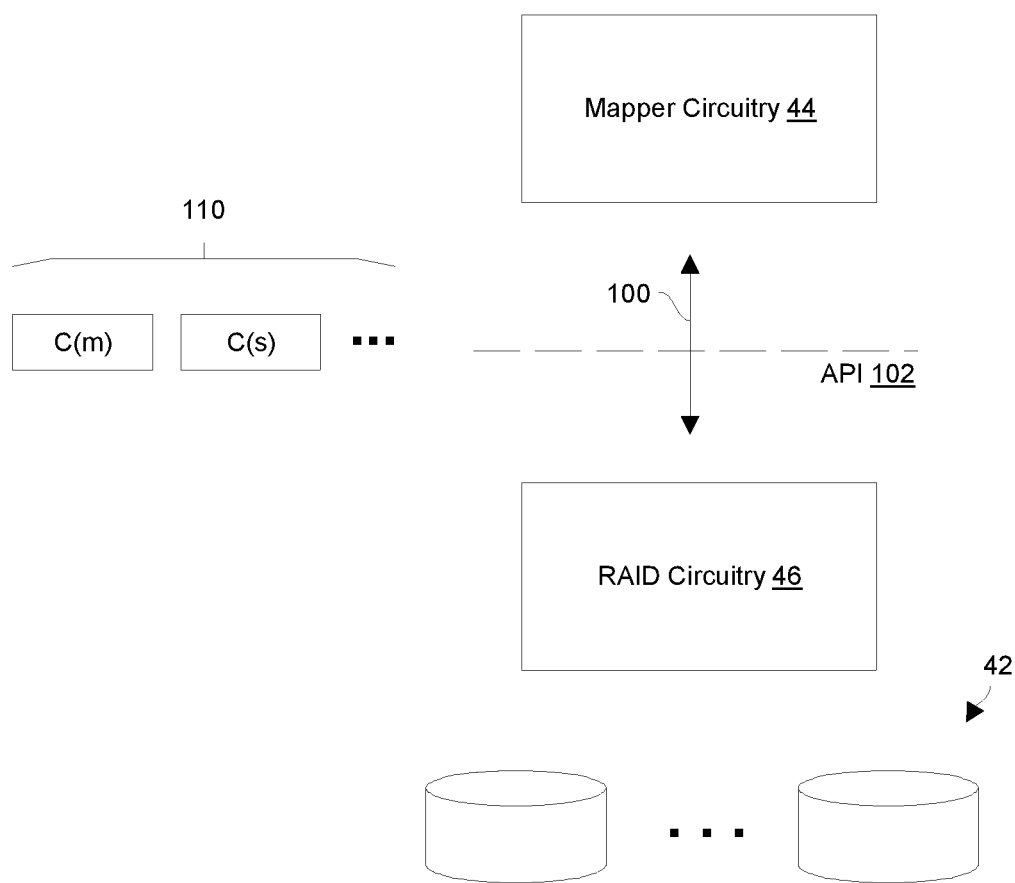
FIG. 3 is a block diagram showing certain details of the data storage equipment in accordance with certain embodiments.

FIG. 3 shows certain details regarding the storage processing circuitry 40 of the data storage equipment 24. In particular, the mapper circuitry 44 and the RAID circuitry 46 coordinate with each other to manage RAID storage space 48 provided by the storage device 42 (also see FIG. 1).

The RAID circuitry 46 is constructed and arranged to form ubers (or RAID extents) from the storage devices 42 for use by the mapper circuitry 44. To this end, the RAID circuitry 46 divides each new storage device 42 into multiple storage device slices (e.g., 4 MB segments) and then combines these slices from different storage devices 42 together to form ubers in accordance with specified RAID levels (e.g., RAID 1 for 1+1 mirroring, RAIDS(4+1), RAIDS(8+1), etc.). The RAID circuitry 46 performs other duties as well such as maintaining spare space for use as a spare storage device when enough spare space is available, and rebuilding data into the spare storage device in the event of a storage device failure, and so on.

The mapper circuitry 44 is constructed and arranged to map user data and metadata into different tiers (i.e., collections of ubers of the same type and width) and expand the storage capacity of such tiers by consuming ubers formed by the RAID circuitry 46. In particular, as a client of the RAID circuitry 46, the mapper circuitry 44 creates a metadata tier and a user data tier, and then consumes new ubers from the RAID circuitry 46 to expand these tiers. The mapper circuitry 44 may perform other duties as well such as monitoring capacity utilization, rebalancing storage space between the metadata tier and the user data tier, providing storage capacity to the RAID circuitry 44 for use as spare storage space upon request, and so on.

The double arrow 100 in FIG. 3 illustrates that the mapper circuitry 44 and the RAID circuitry 46 of the data storage equipment 24 communicating with each other. The dashed line 102 represents such communication occurring through an application programming interface (API). In accordance with certain embodiments, the RAID circuitry 46 is able to request additional storage space capacity from the mapper circuitry 44 using a defined protocol through the API 102.

Capacity Ownership

In accordance with certain embodiments, the mapper circuitry 44 and the RAID circuitry 46 coordinate their respective operations based on capacity ownership. In particular, as further shown in FIG. 3, the mapper circuitry 44 and the RAID circuitry 46 access a set of capacity management parameters 110 which is stored persistently within the data storage equipment 24. The set of capacity management parameters 110 includes a mapper capacity C(m) and a spare capacity C(s) (i.e., values or amounts). The set of capacity management parameters 110 may include other capacity management settings as well.

In some arrangements, the capacity management parameters 110 are maintained (or recorded) in a persisted table within a database (e.g., see the memory 64 in FIG. 2). Accordingly, capacity assignments such as the mapper capacity C(m) and the spare capacity C(s) may be logged, updated, etc. over time.

The mapper capacity C(m) identifies a maximum amount of storage space that is consumable by the mapper circuitry 44 (i.e., the maximum capacity that the mapper circuitry 44 can consume). The mapper circuitry 44 owns this capacity (i.e., the capacity that is promised or committed to the mapper circuitry 44).

It should be understood that the mapper circuitry 44 may be able to reclaim unused storage space within the mapper capacity C(m) such as by shrinking ubers that inefficiently store user data. Along these lines, the mapper circuitry 44 may, from time to time, invoke a background garbage collection service that consolidates ubers having stale or non-current user data into fewer ubers thus regaining unused storage space.

The spare capacity C(s) identifies an amount of storage space that is reserved as spare space for use in response to a storage device failure. The RAID circuitry 46 owns this capacity. It should be understood that the RAID circuitry 46 may occasionally consume spare space from the spare capacity C(s) such as when rebuilding data that resided on a failed storage device 42. In such situations, the spare capacity C(s) shrinks and the RAID circuitry 46 may then require new spare space in the event there is a second storage device failure. As will be explained shortly, the RAID circuitry 46 will attempt to obtain the new spare space from the mapper circuitry 44.

Having now identified certain capacity management parameters 110 such as mapper capacity C(m) and spare capacity C(s), it should be understood that the RAID circuitry 46 breaks the raw physical capacity provided by the storage devices 42 into these two capacities: the mapper capacity C(m) owned by the mapper circuitry 44 and the spare capacity C(s) owned by the RAID circuitry 46. Accordingly, the total physical capacity C(total) may be represented by Equation (1) below:

$$C(total)=C(m)+C(s) \qquad (1).$$

In accordance with certain embodiments, the RAID circuitry 46 controls updating of the capacity management parameters 110. For example, if the spare capacity C(s) shrinks due to consuming spare space in response to a storage device failure, the RAID circuitry 46 updates the spare capacity C(s) setting. Similarly, if the mapper circuitry 44 provides space from the mapper capacity C(m) to the RAID circuitry 46, the RAID circuitry 46 updates both the mapper capacity C(m) and spare capacity C(s).

Through coordination, the mapper circuitry 44 and the RAID circuitry 46 are able to negotiate apportioning the total physical capacity C(total) into the mapper capacity C(m) and the spare capacity C(s) to eliminate uncertainty which could otherwise be caused by uncoordinated capacity consumption. Such coordination may be effectuated through well-defined communications through the API 102.

Protocol

The mapper circuitry 44 and the RAID circuitry 46 are able to negotiate capacity apportionment via a pre-established protocol. Implementation of and adherence to this protocol may be enforced via the API 102 (also see FIG. 3).

Along these lines, the RAID circuitry 46 may request spare capacity from the mapper circuitry 44 by sending unmap calls to the mapper circuitry 44. In accordance with certain embodiments, each unmap call (e.g., UNMAP EVENT) identifies a requested amount of space to the mapper circuitry 44.

In accordance with certain embodiments, the RAID circuitry 46 may set a priority and/or frequency for the unmap calls. The priority and frequency of the unmap calls may be determined by the particular situation.

For example, if the RAID circuitry 46 determines that it has insufficient space for a spare storage device (i.e., the spare capacity C(s) is below a predefined threshold), but there is currently no failed storage device 42 that requires rebuilding, the RAID circuitry 46 may send a low priority unmap call to the mapper circuitry 44 in an attempt to obtain further storage space. Additionally, if the RAID circuitry 46 is unable to obtain all of the requested storage space while there is currently no failed storage device 42 that requires rebuilding, the RAID circuitry 46 may continue to send low priority unmap calls to the mapper circuitry 44 at a low frequency until the RAID circuitry 46 is able to obtain enough space for a complete spare storage device.

As another example, if the RAID circuitry 46 determines that it has insufficient space for a spare storage device but there is currently a failed storage device 42 that requires rebuilding, the RAID circuitry 46 may send a high priority unmap call to the mapper circuitry 44 in an attempt to obtain further storage space. Furthermore, if the RAID circuitry 46 is unable to obtain all of the requested storage space while there is currently a failed storage device 42 that requires rebuilding, the RAID circuitry 46 may continue to send high priority unmap calls to the mapper circuitry 44 at a high frequency until the RAID circuitry 46 is able to obtain enough space to complete a spare storage device.

Additionally, the mapper circuitry 44 may respond to requests for spare space from the RAID circuitry 46 (i.e., the unmap calls) by sending unmap status replies (e.g., UNMAP_STATUS) back to the RAID circuitry 46. In accordance with certain embodiments, each unmap status reply identifies an answered amount of space which may be between zero and the requested amount of space. If there is not currently enough unused space in the mapper capacity C(m) to satisfy the request for spare space, the mapper circuitry 44 may attempt to unmap one or more user data ubers to free up space (e.g., the mapper circuitry 44 may attempt to shrink the number of consumed ubers in the user data tier by consolidating inefficiently used user data ubers).

In accordance with certain embodiments, the mapper circuitry 44 and the RAID circuitry 46 are able to use the above-described protocol to address a variety of situations. The particular activity for each situation depends on how much of storage space the mapper circuitry 44 is able to provide to the RAID circuitry 46 in response to requests from the RAID circuitry 46.

Along these lines, suppose that the RAID circuitry 46 does not have enough spare space to rebuild a failed storage device 42. In such a situation, the RAID circuitry 46 may send the mapper circuitry 44 an unmap call through the API 102 (FIG. 3) asking for an amount of space that would enable the RAID circuitry 46 to complete a spare storage device (i.e., to obtain enough spare space to hold all of the data that resided in the failed storage device 42).

In response to the unmap call, the mapper circuitry 44 may attempt to shrink the user data tier. For example, the mapper circuitry 44 may unmap one or more user data ubers when consolidating user data from those ubers into fewer ubers. The mapper circuitry 44 then provides an unmap status reply back to the RAID circuitry 46 indicating an answered amount of space which may be between zero and the requested amount of space.

Suppose that the mapper circuitry 44 was able to completely satisfy the unmap call by granting the requested amount of space to the RAID circuitry 46. In such a situation, the RAID circuitry 46 updates the mapper capacity C(m) and spare capacity C(s), and uses that space to complete a spare storage device for use in rebuilding data from the failed storage device.

However, suppose that the mapper circuitry 44 was able to only partially satisfy the unmap call by some but less than the requested amount of space to the RAID circuitry 46. In such a situation, the mapper circuitry 44 may initiate or more aggressively run the background garbage collection process (e.g., raise the priority of the background garbage collection process) to reclaim space. Additionally, the RAID circuitry 46 updates the mapper capacity C(m) and spare capacity C(s), but may continue sending unmap calls to the mapper circuitry 44 at a higher priority and/or at a higher frequency.

Furthermore, suppose that the mapper circuitry 44 was not able to provide any space to the RAID circuitry 46 in response to the unmap call. That is, the unmap status reply sent by the mapper circuitry 44 essentially denies the request. In such a situation, the RAID circuitry 46 may continue sending unmap calls to the mapper circuitry 44 at a low priority and/or at a low frequency while waiting for a user (e.g., an administrator of the data storage equipment 24) to free up space (e.g., by deleting one or more volumes, snapshots, etc.).

Example 1

Suppose that the data storage equipment 24 is heavily utilized and that unused storage space is relatively scarce. Further suppose that a first physical storage device 42 fails.

In such a situation, the RAID circuitry 46 leverages the existing spare capacity C(s) to form a spare (e.g., a virtual storage device) and then rebuilds the data that resided on the first failed storage device 42 within the spare. Accordingly, the spare capacity C(s) that is owned by the RAID circuitry 46 decreases.

Once the RAID circuitry 46 has completed the process of rebuilding the failed storage device 42, suppose that the RAID circuitry 46 determines that there is not enough spare capacity C(s) to complete a new spare storage device (i.e., the current value of the spare capacity C(s) is now below a predefined threshold). In such a situation, the RAID circuitry 46 sends an unmap call (e.g., a low priority UNMAP EVENT) to the mapper circuitry 44 through the API 102 (FIG. 3) to request that that the mapper circuitry 44 provide additional storage space from the mapper capacity C(m) owned by the mapper circuitry 44 for use as spare capacity C(s) in the event of another storage device failure. In particular, the unmap call identifies a requested amount of space which is the amount of additional space needed by the RAID circuitry 46 to provide a spare storage device.

If there is enough unused space in the mapper capacity C(m), the mapper circuitry 44 delivers that unused space to the RAID circuitry 46. In particular, the mapper circuitry 44 sends an unmap status reply to the RAID circuitry 46 identifying, as the answered amount of space, the requested amount of space. It should be understood that the mapper circuitry 44 may have been able to unmap one or more user data ubers in order to fully satisfy the unmap call.

Accordingly, the RAID circuitry 46 updates the mapper capacity C(m) and spare capacity C(s). As a result, the RAID circuitry 46 now owns enough spare space for a full spare storage device and is now well-prepared for a future storage device failure.

Example 2

Suppose that, in Example 1 above, the mapper circuitry 46 was not able to provide enough storage space to enable the RAID circuitry 46 to fully replenish the spare capacity C(s) owned by the RAID circuitry 46. That is, suppose that there is still not enough storage space in the spare capacity C(s) for the RAID circuitry 46 to rebuild another failure storage device (i.e., the current value of the spare capacity C(s) is still below a predefined threshold). In such a situation, the RAID circuitry 46 may continue to send low priority unmap calls at a low frequency to the mapper circuitry 46 in an attempt to eventually obtain enough space to complete a spare storage device.

Now, further suppose that the data storage equipment 24 encounters failure of a second storage device. In this situation, the RAID circuitry 46 sends a high priority unmap call to request storage space from the mapper circuitry 44.

In particular, suppose that the RAID circuitry 46 still needs 100 GB of storage space to finish a spare storage device for use in rebuilding the second failed storage device. Accordingly, the RAID circuitry 46 sends a high priority unmap call that requests the mapper circuitry 44 to shrink the mapper capacity C(m) enough to provide 100 GB. Depending on whether the mapper circuitry 44 is successful, the mapper circuitry 44 may provide different outcomes.

Along these lines, if the mapper circuitry 44 is able to shrink the mapper capacity C(m) enough to provide 100 GB requested by the RAID circuitry 46, the mapper circuitry 44 provides an unmap status reply indicating that the mapper circuitry 44 has granted 100 GB of the mapper capacity C(m) to the RAID circuitry 46. In response, the RAID circuitry 46 decreases the mapper capacity C(m) by 100 GB and increases the spare capacity C(s) by 100 GB (also see FIG. 3). The RAID circuitry 46 may update the setting of other capacity management parameters 110 as well.

Next, the RAID circuitry 46 uses the newly acquired 100 GB to complete the spare storage device. As a result, the RAID circuitry 46 is able to rebuild the second failed storage device.

However, if the mapper circuitry 44 is able to shrink the mapper capacity C(m) only enough to provide some but not all of the 100 GB requested by the RAID circuitry 46, the mapper circuitry 44 provides an unmap status reply indicating that the mapper circuitry 44 has granted more than zero but less than 100 GB of the mapper capacity C(m) to the RAID circuitry 46. For example, if the mapper circuitry 44 can only grant 60 GB, the unmap status reply indicates that the mapper circuitry 44 grants only 60 GB. In response, the RAID circuitry 46 decreases the mapper capacity C(m) by 60 GB and increases the spare capacity C(s) by 60 GB.

Moreover, since the RAID circuitry 46 needs another 40 GB to finish the spare storage device, the RAID circuitry 46 may begin sending higher priority unmap calls at a faster frequency (e.g., high priority UNMAP EVENT). Furthermore, the mapper circuitry 44 may initiate or raise the priority level of a background garbage collection service that consolidates data from inefficiently used user data ubers to reclaim storage space more aggressively. Such operation expedites efforts of the mapper circuitry 44 and the RAID circuitry 46 to fully respond to the second failed storage device.

However, suppose that capacity utilization is critically high from the perspective of the mapper circuitry 44 (e.g., the mapper capacity C(m) be below a predefined threshold). In such a situation, the mapper circuitry 44 provides an unmap status reply indicating that no space from the mapper capacity C(m) has been granted. That is, the mapper circuitry 44 denies the space request from the RAID circuitry 46.

In this situation, the RAID circuitry 46 may continue to send unmap calls to the mapper circuitry 44 which are at low priority and low frequency.

At some point, some space consumed by the mapper circuitry 44 may be released. For example, a user may delete one or more volumes, files, snapshots, etc. At that point, the mapper circuitry 44 will be able to shrink the user data tier to reclaims one or more user data ubers for delivery to the RAID circuitry 46 to enable the RAID circuitry 46 to complete a spare store device and rebuild the second failed storage device.

Unmap Opcode

When the mapper circuitry 44 unmaps a user data uber, the mapper circuitry 44 sends an unmap opcode to the RAID circuitry 44. In response to the unmap opcode, the RAID circuitry 44 releases the storage device slices that formed the user data uber. To this end, the RAID circuitry 44 marks the storage device slices as freed, and the storage device slices are available for reuse.

In accordance with certain embodiments, the unmap opcodes may have different values depending on the particular activity performed by the mapper circuitry 44. For example, if the mapper circuitry 44 is unmapping a user data uber to enable the RAID circuitry 44 to use the freed storage device slices to form a spare storage device, the mapper circuitry 44 provides a first unmap opcode. Accordingly, the RAID circuitry 44 is immediately able to consume the freed storage device slices to form the spare storage device.

However, if the mapper circuitry 44 is unmapping a user data uber to balance space between the user data tier and the metadata tier, the mapper circuitry 44 provides a second unmap opcode that is different from the first unmap opcode. In some arrangements, the unmap opcode is simply a flag (or bit) that is either set or not set. However, the unmap opcode may take other forms such as a multi-bit field, etc.

For example, the mapper circuitry 44 may be attempting to expand the metadata tier by shrinking the user data tier. Accordingly, the second unmap opcode informs the RAID circuitry 44 not to consume the freed storage device slices to form the spare storage device. Instead, the RAID circuitry 44 allows the mapper circuitry 44 to consume the space (i.e., the freed storage device slices) to rebalance user data and metadata storage.

As explained above, such coordination between the mapper circuitry 44 and the RAID circuitry 46 removes uncertainty. Accordingly, unnecessary race conditions and/or confusion is avoided.

Updating Capacity

When a storage device is added or removed, the total physical capacity C(total) changes (also see Equation (1) above). In such situations, the RAID circuitry 46 updates the capacity management parameters 110 accordingly.

For example, suppose that a user adds new storage devices 42 to the data storage equipment 24 (also see FIG. 1). As a result, the total physical capacity C(total) increases.

In accordance with certain embodiments, the RAID circuitry 46 replenishes the spare capacity C(s) ahead of the mapper capacity C(m). That is, the RAID circuitry 46 consumes enough storage space to fully complete a spare storage device. Then, if there is additional storage space available, the additional storage space is added to the mapper capacity C(m) for use by the mapper circuitry 44.

In some arrangements, the user is able to customize and/or override this capacity updating process. Accordingly, the user is able to tailor how the pool of storage space expands in response to the addition of new storage devices 42.

Further Details

Figure 4:
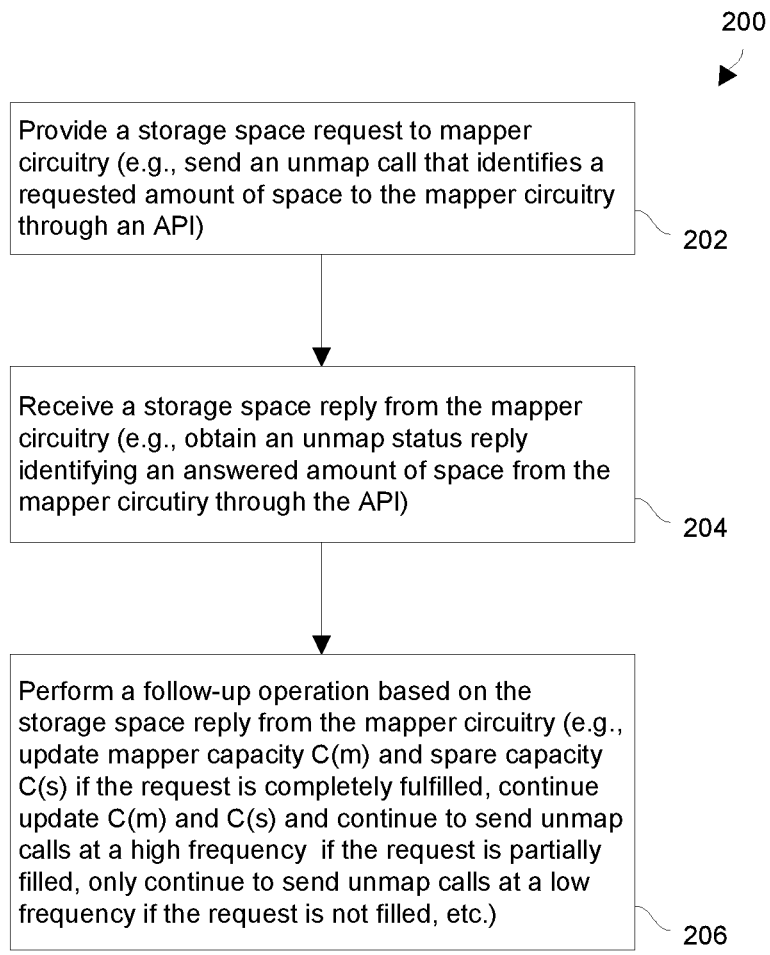
FIG. 4 is a flowchart of a procedure which is performed by RAID circuitry of the data storage equipment in accordance with certain embodiments.

FIG. 4 shows a procedure 200 which is performed by RAID circuitry in accordance with some embodiments. The procedure 200 is performed by the RAID circuitry when managing RAID storage space.

At 202, the RAID circuitry provides a storage space request to mapper circuitry. In particular, the RAID circuitry may send an unmap call identifying a requested amount of space to the mapper circuitry through an API.

At 204, the RAID circuitry receives a storage space reply from the mapper circuitry in response to the storage space request. In particular, the RAID circuitry may obtain an unmap status identifying an answered amount of space from the mapper circuitry through the API.

At 206, the RAID circuitry performs a follow-up operation based on the storage space reply from the mapper circuitry. For example, if the answered amount of space equals the requested amount of space, the RAID circuitry may update the mapper capacity C(m) and the spare capacity C(s) to support rebuilding an entire storage device. However, if the unmap call is merely partially fulfilled, the RAID circuitry may update the mapper capacity C(m) and the spare capacity C(s) but continue to send, at a high frequency, unmap calls requesting more spare space. Furthermore, if the unmap call is not filled at all (i.e., denied), the RAID circuitry may send, at a low frequency, unmap calls requesting spare space, and so on.

Figure 5:
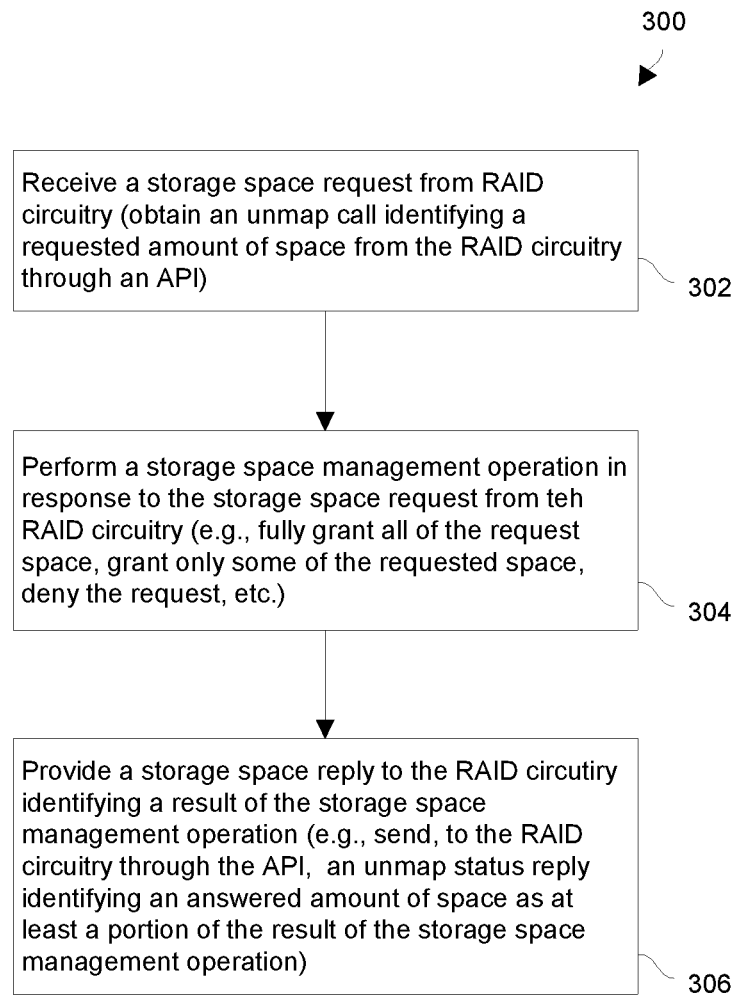
FIG. 5 is a flowchart of a procedure which is performed by mapper circuitry of the data storage equipment in accordance with certain embodiments.

FIG. 5 shows a procedure 300 which is performed by mapper circuitry in accordance with some embodiments. The procedure 300 is performed by the mapper circuitry when managing RAID storage space.

At 302, the mapper circuitry receives a storage space request from RAID circuitry. In particular, the mapper circuitry may obtain an unmap call identifying a requested amount of space from the RAID circuitry through an API.

At 304, the mapper circuitry performs a storage space management operation in response to the storage space request. In particular, the mapper circuitry may determine that enough free capacity currently exists within the mapper capacity value to grant the requested amount of space and full grant all of the requested space to the RAID circuitry. However, the mapper circuitry may determine that not enough free capacity currently exists within the mapper capacity value and grant only some of requested space to the RAID circuitry. Furthermore, the mapper circuitry may deny the request if mapper capacity C(m) is at a critically low level, and so on.

At 306, the mapper circuitry provides a storage space reply to the RAID circuitry, the storage space reply identifying a result of the storage space management operation. In particular, the mapper circuitry may send, to the RAID circuitry through the API, an unmap status identifying an answered amount of space as at least a portion of the result of the storage space management operation.

Figure 6:
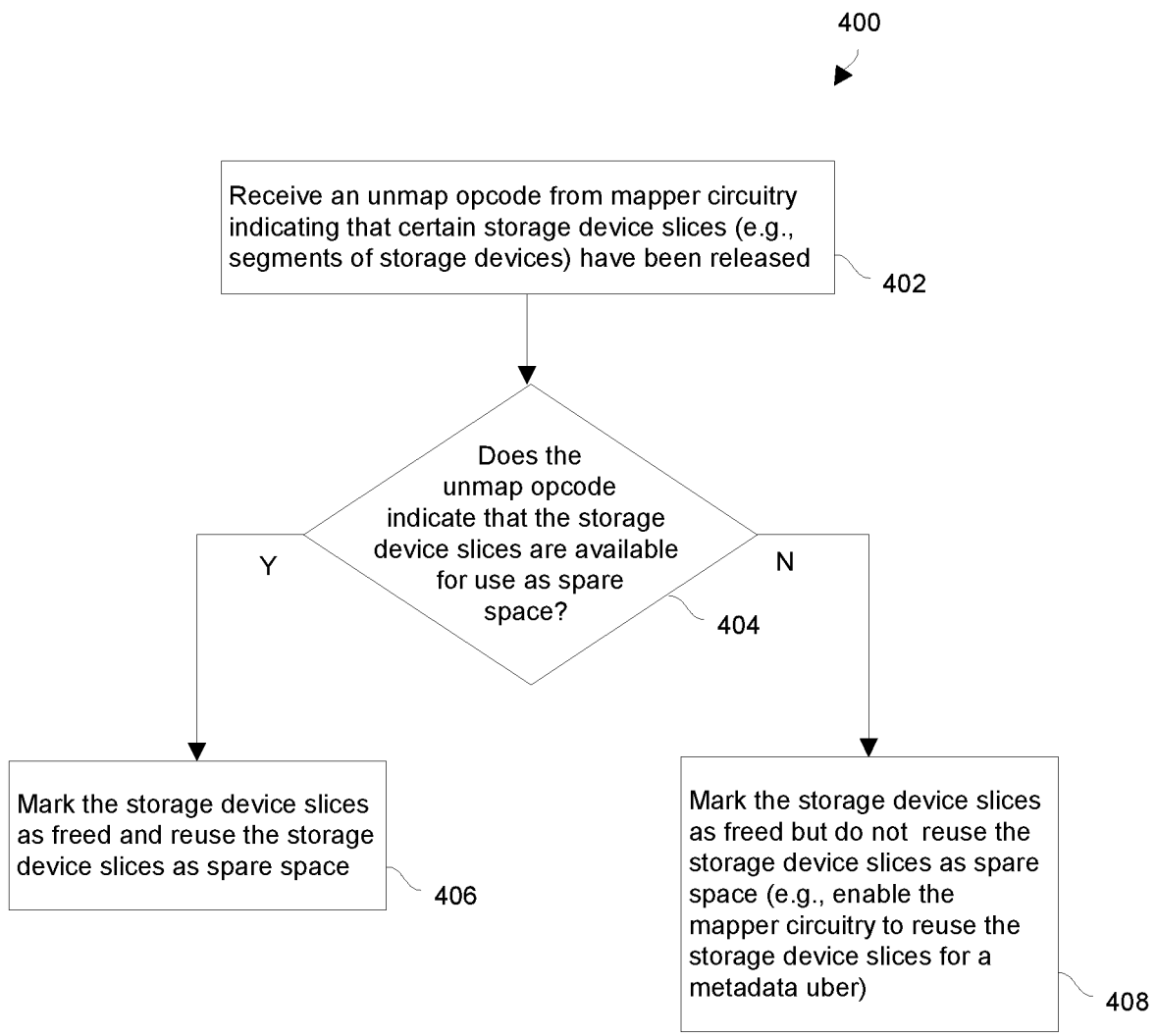
FIG. 6 is a flowchart of a procedure which is performed by RAID circuitry in response to receipt of an unmap opcode in accordance with certain embodiments.

FIG. 6 shows a procedure 400 which is performed by RAID circuitry in accordance with some embodiments. The procedure 400 is performed by the RAID circuitry when receiving an unmap opcode from mapper circuitry when the mapper circuitry unmaps a user data uber.

At 402, the RAID circuitry receives an unmap opcode from the mapper circuitry. The unmap opcode indicates that certain storage device slices (e.g., segments of storage devices) have been released.

At 404, the RAID circuitry proceeds to 406 if the unmap opcode indicates that the storage device slices are available for use by the RAID circuitry as spare space. However, at 404, the RAID circuitry proceeds to 408 if the unmap opcode indicates that the storage device slices are not available for use as spare space.

At 406, the RAID circuitry marks the storage device slices as freed and reuses the storage device slices as spare space. Accordingly, the RAID circuitry is better prepared in the event of a storage device failure.

At 408, the RAID circuitry marks the storage device slices as freed but does not reuses the storage device slices as spare space. Rather, the RAID circuitry allows the mapper circuitry to reuse the freed storage device slices as another uber (e.g., an uber for metadata). To this end, the RAID circuitry may create a new uber and provide it to the mapper circuitry to enable the mapper circuitry to expand the metadata tier.

Figure 7:
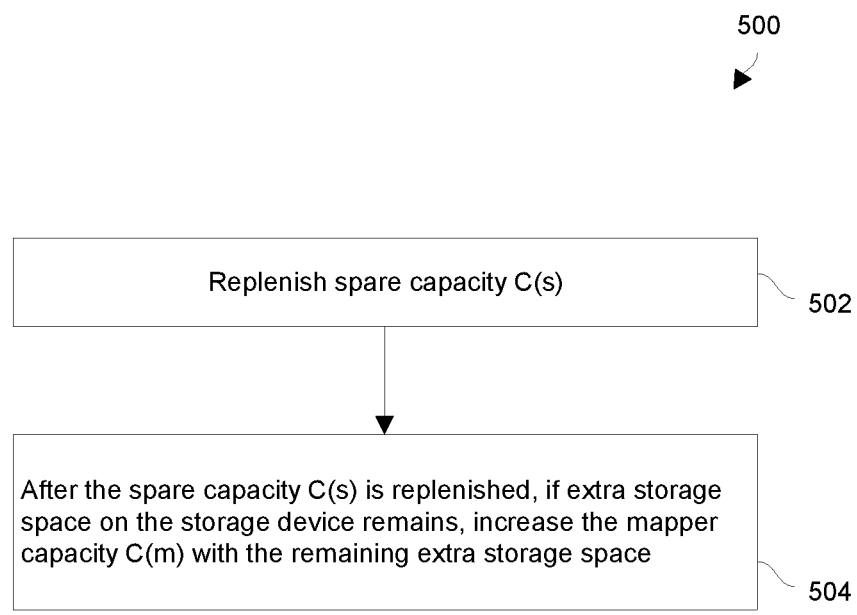
FIG. 7 is a flowchart of a procedure which is performed by the data storage equipment in response to addition of a new storage device in accordance with certain embodiments.

FIG. 7 shows a procedure 500 which is performed by data storage equipment in accordance with some embodiments. The procedure 500 is performed by the mapper circuitry and the RAID circuitry of the data storage equipment when a new storage device is added to the data storage equipment (e.g., also see FIGS. 1 and 3).

At 502, the data storage equipment replenishes the spare capacity C(s). Recall that the spare capacity C(s) is owned by the RAID circuitry and is used for a spare storage device when rebuilding data that resided on a failed storage device. In some arrangements, data on one or more storage device slices may be relocated on to storage device slices of the new storage device in order to free up one or more storage device slices on one or more other storage devices.

At 504, if extra storage space on the storage device remains, the data storage equipment replenishes the mapper capacity C(m). Accordingly, when performing pool expansion in response to a newly added storage device, there is a default bias built-in to the data storage equipment that prefers replenishing spare capacity C(s) ahead of mapper capacity C(m).

It should be understood that a user may be able to override the allocation priority described above. Moreover, the user may be able to subsequently adjust allocations after the procedure 500 completes.

As described above, improved techniques involve mapper circuitry 44 and RAID circuitry 46 communicating with each other to coordinate management of RAID storage space 48. Such techniques may introduce the concept of ownership to physical storage capacity C(total). Additionally, such techniques may provide a protocol for balancing capacity between the mapper circuitry 44 and the RAID circuitry 46 to avoid uncertainty situations (e.g., inadvertently entering a DU state). Furthermore, such techniques may provide a well-defined procedure for updating physical storage capacity ownership in response to adding and/or removing storage devices 42.

One should appreciate that the above-described techniques do not merely manage space. Rather, the disclosed techniques involve specialized processes, communications, and/or operations to avoid uncertainty situations. With such techniques, other advantages are available as well such as effective resource allocation, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the hosts 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of managing Redundant Array of Independent Disks (RAID) storage space, the method comprising:
   providing, by RAID circuitry, a storage space request to mapper circuitry;
   receiving, by the RAID circuitry, a storage space reply from the mapper circuitry in response to the storage space request; and
   performing, by the RAID circuitry, a follow-up operation based on the storage space reply from the mapper circuitry;
   wherein the RAID circuitry is constructed and arranged to persistently maintain a mapper capacity value and a spare capacity value, the mapper capacity value identifying a maximum amount of storage space that is consumable by the mapper circuitry, and the spare capacity value identifying an amount of storage space that is reserved as spare space for use in response to a storage device failure; and
   wherein the method further comprises:
   receiving, by the RAID circuitry, an unmap opcode from the mapper circuitry, the unmap opcode indicating whether the mapper circuitry has released reservable space available for use by the RAID circuitry in response to a storage device failure or whether the mapper circuitry has released unreservable space for use by the mapper circuitry.

2. A method as in claim 1 wherein providing the storage space request to the mapper circuitry includes:
   sending, as the storage space request, an unmap call to the mapper circuitry through an application programming interface (API), the unmap call identifying a requested amount of space.

3. A method as in claim 2 wherein receiving the storage space reply from the mapper circuitry in response to the storage space request includes:
   obtaining, as the storage space reply, an unmap status from the mapper circuitry through the API, the unmap status identifying an answered amount of space.

4. A method as in claim 3 wherein the answered amount of space identified by the unmap status equals the requested amount of space; and
   wherein performing the follow-up operation based on the storage space reply from the mapper circuitry includes:
   decreasing the mapper capacity value by the requested amount of space, and
   increasing the spare capacity value by the requested amount of space to support rebuilding an entire storage device in response to a storage device failure.

5. A method as in claim 3 wherein the answered amount of space identified by the unmap status is more than zero and is less than the requested amount of space; and wherein performing the follow-up operation based on the storage space reply from the mapper circuitry includes:
decreasing the mapper capacity value by the answered amount of space,
increasing the spare capacity value by the answered amount of space, and
sending additional unmap calls to the mapper circuitry through the API to request additional storage space to reach a level that supports rebuilding an entire storage device in response to a storage device failure.

6. A method as in claim 3 wherein the answered amount of space identified by the unmap status is zero; and wherein performing the follow-up operation based on the storage space reply from the mapper circuitry includes:
sending additional unmap calls to the mapper circuitry through the API to request storage space.

7. A method as in claim 1 wherein the method further comprises:
identifying, by the RAID circuitry, added space from a newly added storage device,
apportioning, by the RAID circuitry, a first amount of the added space to the spare capacity value to increase the spare capacity value to a level that supports rebuilding an entire storage device in response to a storage device failure, and
apportioning, by the RAID circuitry, a remaining amount of the added space to the mapper capacity value.

8. Data storage equipment, comprising:
a storage device interface;
mapper circuitry; and
Redundant Array of Independent Disks (RAID) circuitry coupled to the storage device interface and the mapper circuitry, the RAID circuitry being constructed and arranged to manage RAID storage space through the storage device interface by performing a method of:
providing a storage space request to the mapper circuitry,
receiving a storage space reply from the mapper circuitry in response to the storage space request, and
performing a follow-up operation based on the storage space reply from the mapper circuitry;
wherein the RAID circuitry is further constructed and arranged to persistently maintain a mapper capacity value and a spare capacity value, the mapper capacity value identifying a maximum amount of storage space that is consumable by the mapper circuitry, and the spare capacity value identifying an amount of storage space that is reserved as spare space for use in response to a storage device failure; and
wherein the method further comprises:
receiving, by the RAID circuitry, an unmap opcode from the mapper circuitry, the unmap opcode indicating whether the mapper circuitry has released reservable space available for use by the RAID circuitry in response to a storage device failure or whether the mapper circuitry has released unreservable space for use by the mapper circuitry.

9. A computer program product having a non-transitory computer readable medium which stores a set of instructions to manage Redundant Array of Independent Disks (RAID) storage space, the set of instructions, when carried out by RAID circuitry, causing the RAID circuitry to perform a method of:
providing a storage space request to mapper circuitry;
receiving a storage space reply from the mapper circuitry in response to the storage space request; and
performing a follow-up operation based on the storage space reply from the mapper circuitry;
wherein the RAID circuitry is constructed and arranged to persistently maintain a mapper capacity value and a spare capacity value, the mapper capacity value identifying a maximum amount of storage space that is consumable by the mapper circuitry, and the spare capacity value identifying an amount of storage space that is reserved as spare space for use in response to a storage device failure; and
wherein the method further comprises:
receiving, by the RAID circuitry, an unmap opcode from the mapper circuitry, the unmap opcode indicating whether the mapper circuitry has released reservable space available for use by the RAID circuitry in response to a storage device failure or whether the mapper circuitry has released unreservable space for use by the mapper circuitry.

10. A method of managing Redundant Array of Independent Disks (RAID) storage space, the method comprising:
receiving, by mapper circuitry, a storage space request from RAID circuitry;
performing, by the mapper circuitry, a storage space management operation in response to the storage space request; and
providing, by the mapper circuitry, a storage space reply to the RAID circuitry, the storage space reply identifying a result of the storage space management operation;
wherein the RAID circuitry is constructed and arranged to persistently maintain a mapper capacity value and a spare capacity value, the mapper capacity value identifying a maximum amount of storage space that is consumable by the mapper circuitry, and the spare capacity value identifying an amount of storage space that is reserved as spare space for use in response to a storage device failure; and
wherein the method further comprises:
providing, by the mapper circuitry, an unmap opcode to the RAID circuitry, the unmap opcode indicating whether the mapper circuitry has released reservable space available for use by the RAID circuitry in response to a storage device failure or whether the mapper circuitry has released unreservable space for use by the mapper circuitry.

11. A method as in claim 10 wherein receiving the storage space request from the RAID circuitry includes:
obtaining, as the storage space request, an unmap call from the RAID circuitry through an application programming interface (API), the unmap call identifying a requested amount of space.

12. A method as in claim 11 wherein providing the storage space reply to the RAID circuitry includes:
sending, as the storage space reply, an unmap status to the RAID circuitry through the API, the unmap status identifying an answered amount of space as at least a portion of the result of the storage space management operation.

13. A method as in claim 12 wherein performing the storage space management operation in response to the storage space request includes:
determining that enough free capacity currently exists within the mapper capacity value to grant the requested amount of space, and identifying, as the answered amount of space in the unmap status, the requested amount of space to enable the RAID circuitry to decrease the mapper capacity value by the requested amount of space and increase the spare capacity value by the requested amount of space to support rebuilding an entire storage device in response to a storage device failure.

14. A method as in claim 12 wherein performing the storage space management operation in response to the storage space request includes:
determining that some free capacity currently exists within the mapper capacity value but less than the requested amount of space currently exists within the mapper capacity value,
initiating a background garbage collection service to reclaim storage space, and
identifying, as the answered amount of space in the unmap status, more than zero and less than the requested amount of space to enable the RAID circuitry to decrease the mapper capacity value by the answered amount of space, increase the spare capacity value by the answered amount of space, and send additional unmap calls to the mapper circuitry through the API to request additional storage space to reach a level that supports rebuilding an entire storage device in response to a storage device failure.

15. A method as in claim 12 wherein performing the storage space management operation in response to the storage space request includes:
determining that no space capacity is currently exists for the RAID circuitry based on the mapper capacity value, and
identifying, as the answered amount of space in the unmap status, zero to cause the RAID circuitry to send additional unmap calls to the mapper circuitry through the API to request storage space.

16. Data storage equipment, comprising:
a storage device interface;
Redundant Array of Independent Disks (RAID) circuitry; and
mapper circuitry coupled to the storage device interface and the RAID circuitry, the mapper circuitry being constructed and arranged to manage RAID storage space through the storage device interface by performing a method of:
receiving a storage space request from the RAID circuitry;
performing a storage space management operation in response to the storage space request; and
providing a storage space reply to the RAID circuitry, the storage space reply identifying a result of the storage space management operation;
wherein the RAID circuitry is constructed and arranged to persistently maintain a mapper capacity value and a spare capacity value, the mapper capacity value identifying a maximum amount of storage space that is consumable by the mapper circuitry, and the spare capacity value identifying an amount of storage space that is reserved as spare space for use in response to a storage device failure; and
wherein the method further comprises:
providing, by the mapper circuitry, an unmap opcode to the RAID circuitry, the unmap opcode indicating whether the mapper circuitry has released reservable space available for use by the RAID circuitry in response to a storage device failure or whether the mapper circuitry has released unreservable space for use by the mapper circuitry.

17. A computer program product having a non-transitory computer readable medium which stores a set of instructions to manage Redundant Array of Independent Disks (RAID) storage space, the set of instructions, when carried out by mapper circuitry, causing the mapper circuitry to perform a method of:
receiving a storage space request from RAID circuitry;
performing a storage space management operation in response to the storage space request; and
providing a storage space reply to the RAID circuitry, the storage space reply identifying a result of the storage space management operation;
wherein the RAID circuitry is constructed and arranged to persistently maintain a mapper capacity value and a spare capacity value, the mapper capacity value identifying a maximum amount of storage space that is consumable by the mapper circuitry, and the spare capacity value identifying an amount of storage space that is reserved as spare space for use in response to a storage device failure; and
wherein the method further comprises:
providing, by the mapper circuitry, an unmap opcode to the RAID circuitry, the unmap opcode indicating whether the mapper circuitry has released reservable space available for use by the RAID circuitry in response to a storage device failure or whether the mapper circuitry has released unreservable space for use by the mapper circuitry.

18. A method as in claim 10 wherein the RAID circuitry:
identifies added space from a newly added storage device,
apportions a first amount of the added space to the spare capacity value to increase the spare capacity value to a level that supports rebuilding an entire storage device in response to a storage device failure, and
apportions a remaining amount of the added space to the mapper capacity value; and
wherein the method further comprises:
receiving, by the mapper circuitry, the remaining amount of the added space based on the RAID circuitry apportioning the remaining amount to the mapper capacity value.

19. A method of managing Redundant Array of Independent Disks (RAID) storage space, the method comprising:
providing, by RAID circuitry, a storage space request to mapper circuitry;
receiving, by the RAID circuitry, a storage space reply from the mapper circuitry in response to the storage space request; and
performing, by the RAID circuitry, a follow-up operation based on the storage space reply from the mapper circuitry;
wherein the RAID circuitry is constructed and arranged to persistently maintain a mapper capacity value and a spare capacity value, the mapper capacity value identifying a maximum amount of storage space that is consumable by the mapper circuitry, and the spare capacity value identifying an amount of storage space that is reserved as spare space for use in response to a storage device failure; and
wherein the method further comprises:
identifying, by the RAID circuitry, added space from a newly added storage device,
apportioning, by the RAID circuitry, a first amount of the added space to the spare capacity value to increase the spare capacity value to a level that supports rebuilding an entire storage device in response to a storage device failure, and apportioning, by the RAID circuitry, a remaining amount of the added space to the mapper capacity value.

20. A method of managing Redundant Array of Independent Disks (RAID) storage space, the method comprising:

receiving, by mapper circuitry, a storage space request from RAID circuitry;

performing, by the mapper circuitry, a storage space management operation in response to the storage space request; and providing, by the mapper circuitry, a storage space reply to the RAID circuitry, the storage space reply identifying a result of the storage space management operation;

wherein the RAID circuitry is constructed and arranged to persistently maintain a mapper capacity value and a spare capacity value, the mapper capacity value identifying a maximum amount of storage space that is consumable by the mapper circuitry, and the spare capacity value identifying an amount of storage space that is reserved as spare space for use in response to a storage device failure;

wherein the RAID circuitry:

identifies added space from a newly added storage device, apportions a first amount of the added space to the spare capacity value to increase the spare capacity value to a level that supports rebuilding an entire storage device in response to a storage device failure, and apportions a remaining amount of the added space to the mapper capacity value; and wherein the method further comprises:

receiving, by the mapper circuitry, the remaining amount of the added space based on the RAID circuitry apportioning the remaining amount to the mapper capacity value.

* * * * *